United States Patent [19]
Walles

[11] 3,916,048
[45] *Oct. 28, 1975

[54] BARRIER PLASTIC ARTICLES
[75] Inventor: Wilhelm E. Walles, Midland, Mich.
[73] Assignee: The Dow Chemical Company, Midland, Mich.
[ * ] Notice: The portion of the term of this patent subsequent to Aug. 13, 1991, has been disclaimed.
[22] Filed: May 21, 1973
[21] Appl. No.: 362,561

[52] U.S. Cl. .................................... 428/35; 428/463
[51] Int. Cl.² ............................................ B65D 1/00
[58] Field of Search .................... 117/71 R, 47 A; 220/DIG. 14, 64; 215/1 C, DIG. 6

[56] References Cited
UNITED STATES PATENTS

| | | | |
|---|---|---|---|
| 2,680,695 | 6/1954 | Judd | 117/35 |
| 2,923,651 | 2/1960 | Petriello | 117/71 R |
| 3,471,313 | 10/1969 | Saubestre et al. | 117/71 |
| 3,480,464 | 11/1969 | Lacy | 117/71 R |
| 3,617,368 | 11/1971 | Gibbs et al. | 117/161 UN |
| 3,625,751 | 12/1971 | Walles | 117/62 |
| 3,783,005 | 1/1974 | Kenney | 117/47 A |
| 3,828,960 | 8/1974 | Wallas | 117/47 A |

FOREIGN PATENTS OR APPLICATIONS 824,438  12/1959  United Kingdom ............. 117/71 R OTHER PUBLICATIONS
Hackh's Chemical Dictionary, Third Edition, 1944, p. 214.

Primary Examiner—Cameron K. Weiffenbach
Assistant Examiner—Ralph E. Varndell
Attorney, Agent, or Firm—Michael S. Jenkins

[57] ABSTRACT

A plastic article is rendered essentially impermeable to atmospheric gases and other vapors by metallizing the wall structure of the plastic article with a metal to form a thin metal layer and overcoating the metal layer with a latex of an organic polymer, particularly a barrier polymer such as a vinylidene chloride polymer, to provide alayer of the organic polymer adherent to the metal layer.

10 Claims, No Drawings

BARRIER PLASTIC ARTICLES

BACKGROUND OF THE INVENTION

This invention relates to plastic articles having wall structure which is essentially impermeable to gases, and, more particularly, to plastic articles having wall structures of organic plastic support having deposited therein a metal layer and a layer of organic polymer.

In the art of manufacturing synthetic resinous structures, it is often desirable to render such structures impermeable of atmospheric gas and other vapors. Such impermeability is particularly desirable in articles used for packaging many materials. Unfortunately, as is well known, most common organic polymers such as the polyolefins, styrene polymers and the like do not, by themselves, possess sufficient resistance to transmission of atmospheric gases and other vapors to be useful in packaging many air-sensitive items.

Accordingly, it has been a practice to treat or coat such polymers with a wide variety of materials such as barrier polymers, e.g., vinylidene chloride polymers, or metals in order to achieve improved barrier. See, for example, U.S. Pat. Nos. 3,459,591 to Konishi et al and 3,480,464 to Lacy. However, the permeability of such resultant structures is often too high for certain applications. Often when metal layers of sufficient thickness to provide barrier are applied, the resultant structures are too thick and too rigid to be useful in many applications. Furthermore, normal flexure or crumpling of such structures having relatively thick metal layers markedly reduces the barrier properties.

In view of the foregoing problems in achieving suitable barrier in prior art structures, it would be highly desirable to provide a structure including an organic plastic support which possesses improved barrier even though only a very thin metal layer is employed.

SUMMARY OF THE INVENTION

The present invention in one aspect is a plastic article embodying such a desirable barrier structure. Specifically, the structure comprises a substrate of a plastic material having deposited on at least one surface thereof a metal layer which is overcoated with a layer of an organic polymer which is adherent to the metal layer, said organic polymer having been applied to the metal layer in the form of a latex. For the purposes of this invention, "latex" means an aqueous colloidal dispersion of an organic polymer.

In another aspect, this invention is a method for preparing the barrier structure which comprises (1) metallizing at least one surface of a plastic material substrate to provide a metal layer adherent to the substrate and (2) applying a latex of an organic polymer to the metal layer to provide an essentially continuous film layer of the organic polymer adherent to the metal layer.

Surprisingly, it is found that, when the organic polymer is applied to the metallized surface in the form of a latex, the barrier structure of the present invention is substantially better in resisting transmission of atmospheric gases and other vapors than expected.

The plastic articles employing the barrier structure are useful as containers for oxygen-sensitive materials such as meats, dairy products and oleaginous foods and as packaging materials for a wide variety of other products which are sensitive to atmospheric gases and other vapors or which normally permeate packages fabricated of organic polymers.

DESCRIPTION OF THE PREFERRED EMBODIMENTS

The substrate of plastic material is suitably fabricated of any normally solid, organic polymer. Preferably, the substrate is fabricated of polymers which are also thermoplastic such as those which are easily fabricated into an article of desired shape and which have sufficient strength to withstand the handling and abuse to which the desired article is commonly subjected.

Exemplary polymers include the structural or engineering polymers such as polymers of $\alpha$-monoolefin, e.g., polymers of ethylene, propylene, butenes including homopolymers and copolymers thereof and of other $\alpha$-olefins having less than 12 carbon atoms; monovinylidene carbocyclic aromatic polymers, e.g., polystyrene, styrene/butadiene copolymers, styrene/acrylonitrile copolymers, styrene/butadiene/acrylonitrile polymers (so-called ABS polymers), styrene/maleic anhydride copolymers and others disclosed in U.S. Pat. Nos. 3,336,227 to Zimmerman et al and 2,971,939 to Baer (so-called high temperature resins), copolymers of the monovinylidene aromatic monomers and other copolymerizable ethylenically unsaturated monomers; acrylic polymers such as polymethyl methacrylate and polymers of other alkyl esters of $\alpha,\beta$-ethylenically unsaturated carboxylic acids such as ethyl acrylate, $\beta$-hydroxyethyl acrylate, ethyl hydrogen maleate, diethyl fumarate and the like; structural polymers of other ethylenically unsaturated monomers such as vinyl and vinylidene halides, e.g., vinyl chloride and vinylidene chloride, acrylonitrile, acrylamide, methyl vinyl ether, vinyl acetate, dienes such as butadiene and isoprene; polyformaldehyde resins; polyesters such as poly(ethylene terephthalate), polycarbonates, polysulfones, polyamides such as nylon and others.

In addition to the foregoing polymers, the plastic substrate may contain one or more additaments such as fillers, stabilizers, surface modifiers, dyes, gas absorbing materials, etc.

Because injection molding, extrusion molding or similar techniques are preferred in fabricating the plastic substrate, the plastic materials are preferably thermoplastic. However, thermosetting polymers can also be used.

The thickness of the organic plastic substrate is not critical. Generally, however, it advantageously is in the range from about 0.5 to about 300 mils, preferably from about 1 to about 100 mils.

Since many of the foregoing polymers of the plastic substrate are not readily metallized in their normal state, it is desirable to treat the surface of the substrate to render it metallizable. Any conventional treatment for achieving this purpose is suitable for the purposes of this invention. Generally treatments which oxidize, sulfonate, or otherwise render the substrate surface water wettable are preferred, with sulfonation techniques as disclosed in U.S. Pat. No. 3,625,751 to Walles being especially preferred. Other techniques such as corona discharge, oxidation with chromic acid-sulfuric acid reagents and the like are suitable.

Metallization is carried out by depositing a coating of a metal such as silver, lead, nickel, aluminum, copper, gold, titanium, tin, bismuth, antimony, chromium, manganese and the like including alloys thereof by known thermal evaporation, chemical vapor deposition, cathodic sputtering, electroplating or electroless plating techniques. Preferably, electroless plating techniques such as described by F. A. Lowenheim in *Metal Coating of Plastics*, Noyes Data Corporation (1970) are employed. See also S. H. Pinner, et al, *Plastics: Surface and Finish*, Daniel Davey and Co., Inc., 172–186 (1971) and U.S. Pat. No. 2,464,143. In addition, other metals such as iron, cobalt and metals of the platinum group and their alloys are suitable used. Of the foregoing metals, silver, nickel or alloys thereof are preferred. In especially preferred embodiments, a coating of tin compound is deposited on the substrate plastic surface prior to deposition of one or more of the aforementioned preferred metals. If the coating of tin compound is applied, it is usually applied in amounts in the range from about 0.5 to about 50 $\mu g/cm^2$. The coating of tin compound is preferably applied by contacting the water-wettable surface of the plastic substrate with a dilute aqueous solution of a tin compound such as tin dichloride.

The quantity of metal deposited in forming the desired metal layer is that amount which forms an essentially continuous film over the desired surface of the plastic substrate and thereby renders the substrate partially impermeable. Preferably, the quantity of metal deposited is in the range from about 0.025 to about 2500 micrograms per square centimeter ($\mu g/cm^2$), especially from about 20 to about 1000 $\mu g/cm^2$. The metal layer should be extensive enough that the surface or surfaces of the substrate requiring the metal layer be essentially covered by metal. Suitably, the metal layer is applied to at least 95 percent, preferably to at least 99 percent, of said surface. It is understood that the metal coating is composed of metal crystals with some open spaces therebetween. However, those metallization techniques which minimize the total area of open spaces between crystals are especially preferred.

The organic polymer for overcoating the metal layer is suitably a normally solid organic polymer which, when in latex form, will form a continuous film at temperatures below the heat distortion point of the organic polymer of the organic plastic substrate. For the purposes of this invention, the heat distortion point of a polymer is the minimum temperature at which an article fabricated of the polymer distorts as a result of the tendency of the polymer to return to its prefabrication shape and/or as a result of minimal outside force. Exemplary polymers suitable for overcoating the metal layer include polymers, i.e., homopolymers and copolymers, of the following monomers: α-monoolefins such as ethylene, propylene, butene-1, isobutene and other α-monoolefins having less than 12 carbon atoms; monovinylidene aromatic carbocyclic monomers such as styrene, 2-methylstyrene, ar-t-butylstyrene, ar-chlorostyrene, vinyl naphthalene and the like; conjugated aliphatic dienes such as butadiene, isoprene and others having less than 12 carbon atoms; alkyl esters of α,β-ethylenically unsaturated carboxylic acids such as ethyl acrylate, methyl methacrylate, 2-hydroxyethyl acrylate, ethyl hydrogen maleate, dipropyl fumarate and others having up to 18 carbon atoms; unsaturated esters of carboxylic acids such as vinyl acetate, vinyl propionate and vinyl benzoate; vinyl and vinylidene halides such as vinyl chloride and vinylidene chloride; and other ethylenically unsaturated monomers such as acrylonitrile, methacrylonitrile, acrylamide, methyl vinyl ether, methyl benzyl ketone and the like. These polymers also may contain small amounts, e.g., up to about 15 weight percent, of emulsifying monomers, e.g., the α,β-ethylenically unsaturated carboxylic acids such as acrylic acid, methacrylic acid, fumaric acid, itaconic acid and the like. Of the foregoing polymers, those exhibiting barrier characteristics are preferred. For purposes of this invention, a film of polymer exhibiting a permeability less than about 6 cubic centimeters/100 square inches of film area/mil of film thickness/day (cc/100 sq. in./mil/day) under ambient conditions is a film of a polymer having barrier characteristics (a so-called barrier polymer). Films of preferred barrier polymers exhibit permeabilities less than about 0.9 cc/100 sq. in./mil/day. Exemplary barrier polymers include polymers of vinylidene chloride containing at least 50 weight percent, preferably at least 70 weight percent, of vinylidene chloride and a remaining amount of copolymerizable ethylenically unsaturated comonomer, e.g., as listed hereinbefore. Of particular interest are vinylidene chloride/vinyl chloride copolymers, vinylidene chloride/acrylonitrile copolymers and the like, especially those described in U.S. Pat. No. 3,617,368 to Gibbs et al.

The overcoating of the organic polymer is applied in latex form to the exposed surface of the metal layer. For purposes of this invention, a latex means a dispersion of colloidal size particles of the polymer in an aqueous medium which may contain additives such as emulsifiers and modifiers commonly added to latexes. Following application of the latex, the latex is dried to form a continuous film at a temperature below the heat distortion point of the organic polymer of the substrate. Although maximum thickness of the film is not particularly critical, the thickness of the resulting film is advantageously sufficient to provide a coating weight in the range from about 5 to about 12,000 $\mu g/cm^2$, preferably from about 60 to about 2500 $\mu g/cm^2$. The overcoating of the organic polymer should be extensive enough to essentially cover the exposed surface of the metal layer. Advantageously, the organic polymer overcoating covers at least 95 percent of the exposed surface of the metal layer, preferably at least about 99 percent.

An exemplary valuable utility for the barrier structure is a vacuum container having double wall construction wherein the barrier structure of this invention comprises both walls of the container. It is found that such vacuum containers can retain a vacuum between the walls for periods of time sufficient to render them commercially useful substitutes for glass and steel vacuum containers. The copending application Ser. No. 305,451 filed Nov. 10, 1972 illustrates more completely vacuum containers similar to the aforementioned containers.

The following examples illustrate the manner in which the principles of the invention are applied but are not to be construed as limiting the scope of the invention. All gas transmission rates are reported as cubic centimeters per 100 square inches per mil per 24 hours per atmospheric at 23°C. All parts and percentages are by weight unless otherwise indicated.

EXAMPLE 1

Polystyrene is extruded into a film having a thickness of 5 mils. One surface of the film is surface sulfonated to a degree of 1.5 micrograms of sulfur trioxide equivalents per square centimeter by contacting the surface with dry air containing 2% sulfur trioxide gas at 25°C for 1 minute.

A metallizing bath is prepared by mixing one part each of the following solutions:

0.60% $Ag(NH_3)_2NO_3$ in $H_2O$
0.30% $NaOH$ in $H_2O$
0.15% glucose and 0.15% fructose in $H_2O$ The surface sulfonated film is dipped into the bath and metallization is completed within 1 minute. The metallized film is removed from the bath and washed with water. The amount of the metal deposited is determined to be 220 $\mu g/cm^2$. A portion of this film is taken, tested for permeability and the results in rate of oxygen transmission are reported in Table I for purposes of comparison.

The remaining portion of metallized film is overcoated with a vinylidene chloride/acrylonitrile/sulfoethyl methacrylate (90/8/2) terpolymer by applying a 50% solids latex of the terpolymer having an average particle size of 0.22 micron to the exposed surface of the metal layer using a Meyer rod. The metallized film is removed from the latex, excess latex is allowed to run off and the remaining latex is dried to a film having a coating weight of 1200 $\mu g/cm^2$. The resultant film is tested for oxygen permeance and the results in oxygen transmission rate are recorded in Table I.

As shown by Sample Nos. 3–5, the additivity rule of $1/Q = \Sigma \, dn/Pn$ is confirmed. Surprisingly, however, permeance for Sample No. 1 does not conform to the additivity rule since measured oxygen permeance of 0.013 cc/100 sq. in./day/atm is 1/18 of the calculated oxygen permeance of 0.24 cc/100 sq. in./day/atm.

EXAMPLE 2

The inside surfaces of two bottles fabricated of styrene/acrylonitrile copolymer and having a thickness of 100 mils are surface sulfonated to provide a sulfonate layer thickness of 3 microns (20 $\mu g \, SO_3/cm^2$) by contacting the surfaces with dry air containing 2% sulfur trioxide gas at 25°C for 1 minute.

The surface sulfonated bottles are rinsed with the 0.001% $SnCl_2$ in water to provide a tin coating on sulfonated surfaces, said coating having a thickness of 0.5 micron.

A metallizing bath is prepared by mixing one part each of the following solutions:

0.60% $Ag(NH_3)_2NO_3$ in $H_2O$
0.30% $NaOH$ in $H_2O$
0.15% glucose and 0.15% fructose in $H_2O$.

The tin coated bottles are dipped into the bath and metallization of the sulfonated surfaces is completed within 1 minute. The metallized bottles are removed from the bath and washed with water. The amount of the metal deposited is determined to be 1000 $\mu g/cm^2$.

The inside surface of one bottle is overcoated with a vinylidene chloride/acrylonitrile/sulfoethyl methacrylate (90/8/2) terpolymer by pouring a 50% solids latex of the terpolymer having an average particle size of 0.22 micron into the bottle and swirling the bottle such that the entire inside surface is contacted with the latex. The excess latex is poured from the bottle and the remaining latex is dried to a film having a coating weight of 2500 $\mu g/cm^2$. In a similar manner the remaining bottle is coated with a 35% solids latex of styrene/butadiene copolymer.

The resultant bottles are tested for nitrogen permeance by placing the bottles in an oven at 76°C for 6 days and measuring transmitted nitrogen with a mass spectrometer. The nitrogen permeance rates are 0.03 $cc_N$/100 sq. in./atm/day for the bottle coated with vinylidene chloride terpolymer and 0.09 $cc_N$/100 sq. in./atm/day for the bottle coated with styrene/butadiene copolymer.

What is claimed is:

1. A barrier plastic container comprising a normally solid, organic plastic substrate which has a water wettable surface and has deposited thereon and adherent thereto a metal layer which is overcoated with a layer of organic copolymer which adheres to the metal layer, said organic polymer having been applied to the metal layer in the form of a latex capable of forming a continuous film at temperatures below the heat distortion point of the plastic substrate.

2. The container of claim 1 which is in the form of a bottle.

3. The container of claim 2 wherein the plastic substrate is a polymer selected from the group consisting of an $\alpha$-monoolefin having less than 12 carbon atoms; monovinylidene carbocyclic aromatic polymers; polymers of alkyl ester of $\alpha,\beta$-ethylenically unsaturated carboxylic acids; structural polymers of vinyl and vinylidene halides, acrylonitrile, acrylamide, methyl vinyl ether, vinyl acetate, and dienes; polyformaldehyde resins; polyesters; polycarbonates; polysulfones; and polyamides.

4. The container of claim 3 wherein a metal is silver, lead, nickel, aluminum, copper, gold, titanium, tin, bismuth, antimony, chromium, or manganese including alloys thereof.

5. The container of claim 4 wherein the organic polymer for overcoating the metal layer is suitably a normally solid organic polymer which, in latex form, will form a continuous film at temperatures below the heat distortion point of the organic plastic substrate, said organic polymer is selected from the group consisting of $\alpha$-monoolefins having less than 12 carbon atoms; monovinylidene aromatic carbocyclic monomers; conjugated aliphatic dienes; alkyl esters of $\alpha,\beta$-ethylenically unsaturated carboxylic acids; unsaturated esters of carboxylic acids; vinyl and vinylidene halides; acrylonitrile; methacrylonitrile; acrylamide; methyl vinyl ether; and methyl benzyl ketone.

6. The container of claim 1 wherein the substrate has a thickness in the range from about 0.5 to about 300 mils, the methyl layer has a thickness in the range from about 0.0001 to about 0.1 mil and the layer of organic polymer has a thickness from about 0.001 to about 2.5 mils.

7. The container of claim 6 wherein the metal layer is applied to the substrate by an electroless metal deposition technique in which the water wettable surface of the plastic substrate is first coated with a dilute aqueous solution of a tin compound and subsequently metallized.

8. The container of claim 7 wherein the metal is silver.

9. The container of claim 8 wherein the organic polymer is a vinylidene chloride polymer.

10. The container of claim 8 wherein the organic polymer is a styrene/butadiene copolymer.

* * * * *

UNITED STATES PATENT AND TRADEMARK OFFICE
CERTIFICATE OF CORRECTION

PATENT NO. : 3,916,048
DATED : October 28, 1975
INVENTOR(S) : Wilhelm E. Walles

It is certified that error appears in the above-identified patent and that said Letters Patent are hereby corrected as shown below:

In the Abstract, line 7, "alayer" should be deleted and insert -- a layer--.

Column 1, line 9, delete "therein" and insert --thereon--.

Column 4, line 62, delete "atmospheric" and insert --atmosphere--.

Column 5, after line 27, insert --Table I-- (see attached copy).

Column 5, line 55, insert -- $\sim$ -- before "1000 µg/cm$^2$".

Column 6, line 5, delete "$CC_N$ /100" and insert --$CC_{N2}$/100--.

Column 6, line 14, delete "copolymer" and insert --polymer--.

Column 6, line 25, delete "ester" and insert --esters--.

UNITED STATES PATENT AND TRADEMARK OFFICE
CERTIFICATE OF CORRECTION

PATENT NO. : 3,916,048
DATED : October 28, 1975
INVENTOR(S) : Wilhelm E. Walles

It is certified that error appears in the above-identified patent and that said Letters Patent are hereby corrected as shown below:

Column 6, line 50, delete "methyl" and insert --metal--.

Signed and Sealed this eighteenth Day of May 1976

[SEAL]

Attest:

RUTH C. MASON
*Attesting Officer*

C. MARSHALL DANN
*Commissioner of Patents and Trademarks*

TABLE I

| Sample No. | Type | Coating Thickness µg/cm² (mil) (1) | Oxygen Transmission Rate, cc/100 sq in/day/atm Measured (2) | Calculated (3) |
|---|---|---|---|---|
| 1 | Silver<br>Barrier Plastic | 220 (0.01)<br>1200 (0.22) | 0.013 | 0.24 |
| 2* | Silver | 220 (0.01) | 6.3 | 6.3 |
| 3* | Barrier Plastic | 710 (0.13) | 0.43 | 0.43 |
| 4* | Barrier Plastic | 980 (0.18) | 0.31 | 0.31 |
| 5* | Barrier Plastic | 1420 (0.26) | 0.20 | 0.21 |
| 6* | None, Surface Sulfonated | — | 25.0 | 25.2 |
| 7* | None, Untreated | — | 25.2 | 25.2 |

\* Not an example of the invention (1) Coating thickness is measured in micrograms (µg)/square centimeter (cm²) from which thickness in mils is calculated using the equation: Thickness (mils) = 393.7 mils/cm · $\frac{\text{weight (µg)}}{\text{Density (µg/cm}^3\text{)} \times \text{area (cm}^2\text{)}}$ The densities for the layers of materials are as follows: silver = 10.5 g/cm³ and barrier plastic = 1 g/cm³.

(2) Determined by using a mass spectrometer to measure permeated oxygen at 25°C for 24 hours.

(3) Calculated using $\frac{1}{Q} = \Sigma \frac{d_n}{P_n}$ wherein Q is the permeability of the total film structure to the named gas in cc/100 sq. in./day/atm, $P_n$ is the permeability of a one mil layer in that film and $d_n$ is the thickness of the layer in mils. For example, in Sample No. 1, $\frac{1}{Q} = \frac{5}{125} + \frac{0.01}{0.083} + \frac{0.22}{0.056} = \frac{0.24}{0.056}$ where permeability of the layers is as follows: $P_{\text{Boundary wall}} = 125$, $P_{\text{Silver}} = 0.083$, and $P_{\text{Barrier Plastic}} = 0.056$. Permeabilities of the various layers are measured by mass spectrometry.